INVENTORS
JAMES B. COLE, Jr.
GEORG D. EDWARDS
THOMAS K. RICE

2,832,213
BOOSTER-GAP EXPLOSIVE SENSITIVITY TEST DEVICE

James B. Cole, Jr., Chattanooga, Tenn., and George D. Edwards and Thomas K. Rice, Washington, D. C., assignors to the United States of America as represented by the Secretary of the Navy Application October 20, 1955, Serial No. 541,872

1 Claim. (Cl. 73—35)

(Granted under Title 35, U. S. Code (1952), sec. 266)

The invention described herein may be manufactured and used by or for the Government of the United States of America for governmental purposes without the payment of any royalties thereon or therefor.

The present invention relates to explosive test devices and more particularly to booster gap explosive sensitivity test devices for evaluating shock sensitivity of liquid explosives.

In considering the handling properties of an explosive, serious consideration must be given the possibility of hazard from detonation due to mechanical shock. The determination of how much shock can be tolerated is very important and some standard tests to measure the sensitivity of explosives in terms of explosion under mechanical or hydrodynamic shock are therefore needed.

One prior explosive test device for establishing the shock tolerance limit is the card test and employs heavy cords attached to the floor and ceiling of a firing chamber to suspend a board which supports a cup containing liquid explosive; a tetryl pellet, cap holder and spacer cards being drawn snug against the bottom of the cup by elastic bands. Although serving the purpose, the suspension set up has proved expensive and excessively time consuming. A later test device employs a three-legged table having a top and shelf, the tetryl pellet resting on the shelf and supporting the spacer cards and cup, the cup being passed through a close-fitting opening in the top and the cap holder being extended through a hole drilled in the shelf. This later test device has the advantages that the several parts thereof are few, simple and inexpensive, and their assembly for firing is an easy task, requiring less time than the suspension set up.

Further attempts to cut costs, increase the safety and reduce the time required for each firing test resulted in the test device of this invention. Briefly, this test device includes a set of snug-fitting telescopic cardboard tubes and a cylindrical wooden block for holding the cap, the cap holder, pellet, spacer cards, which are circular, and the cup of liquid explosive fit compactly in the tubes when assembled; the entire assembly being supported by a metal pedestal. Actual use of the test device of this invention has made apparent its speed and convenience; fabrication time is eliminated, rigging and clean up time are reduced, proper alignment of cap, pellet, cards and cup is assured, and the cost is less per test shot than by the other prior test devices.

It is therefore an object of the present invention to provide a test device including means for supporting the various elements of the tests in proper alignment.

Another object is the provision of a test device which possesses greater working safety and the parts of which are less costly and cut down the working time per test, thus reducing the cost per test.

A final object of the present invention is the provision of a set of parts which are expendable, relatively simple and inexpensive to produce and which can be assembled with the test elements in proper alignment in a rapid and facile manner.

The exact nature of this invention as well as other objects and advantages thereof will be readily apparent from consideration of the following specification relating to the annexed drawing in which.

Figure 1:
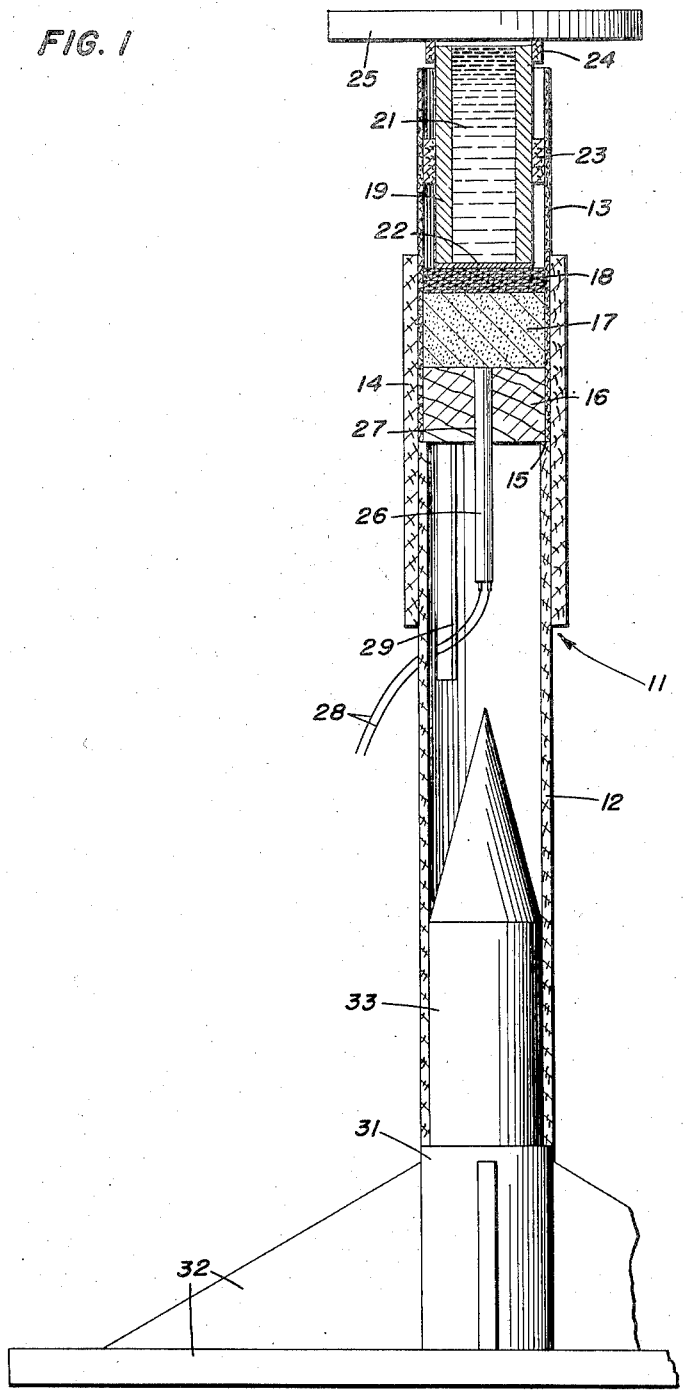
Fig. 1 is an elevational view of the test device of this invention, with parts broken away or in section.

Referring now to the drawings, wherein like reference characters designate like or corresponding parts throughout the several views, there is shown in Fig. 1 (which illustrates a preferred embodiment) an explosive testing device designated generally by the numeral 11. The test device 11 comprises a support tube 12 and a pellet tube 13; the pellet tube being held in alignment with the support tube by means of coupling tube 14. Tubes 12 and 13 are made of cardboard or like material and have the same outside diameter of a size to fit snugly within tube 14, also of cardboard or the like, but the inside diameter of tube 12 is less than the inside diameter of tube 13 whereby a ledge 15 is provided. Ledge 15 is employed for the purpose of supporting a cylindrical cap support block 16 made from resilient wood, such as sugar pine or the like, and is received within the pellet tube 13 and rests upon the ledge. Also received in tube 13 is a booster charge in the form of a cylindrical tetryl pellet 17 which rests upon the cap support block 16. Resting on top of the pellet 17 are stacked spacer cards 18 which in turn support a cup 19, the cup being adapted to contain the liquid explosive 21 being tested, the bottom of the cup being closed by a thin flat diaphragm 22.

The spacer cards 18 serve to build up a gap between the tetryl pellet 17 and the bottom of the cup 19 and the gap may be varied by using different numbers of cards which are made from smooth-finish cellulose acetate sheet stock nominally 0.010 inch in thickness. The sheet stock should have smooth surfaces free from ripples, thick spots and dimples, and should be dimensionally stable; thickness should be held to close tolerances. Cards of paper are not recommended because they are not dimensionally stable under varying conditions of ambient humidity.

Cup 19 may be made of any desired material and two types of cups have been developed. The first, which is limited to testing of non-corrosive liquids, is made from galvanized 1 inch welded steel pipe 3 inches in length and utilizes shim brass 0.0015 inch thick as the bottom diaphragm material. The second type of cup is dimensionally the same as the first but is made from black seamless (extruded) pipe and Teflon tape 0.003 inch thick is employed as the diaphragm material, the walls of the cup being coated with a film of Teflon. It has been found experimentally that Teflon attenuates the booster shock somewhat less than does brass.

For centering cup 19 with respect to the cards 18 and pellet 17 there is employed an aligning or centering collar tube 23 surrounding the cup and fitting within tube 13. Encircling the top end of cup 19 is a stand-off collar tube 24 for the purpose of supporting a target plate 25 out of contact with the liquid explosive within the cup and thereby prevent chemical action between the target plate and corrosive liquids and heat transfer between the plate and liquid, and avoid trapping air bubbles at the top of the liquid which could produce misleading conclusions. Tubes 23 and 24 are made of cardboard or the like, and plate 25 is preferably a piece of cold-rolled steel ⅜ inch thick.

Detonation in the tetryl pellet 17 is initiated by an electric blasting cap 26 abutting the bottom face of the pellet and extending upwardly through a close-fitting hole 27 drilled in the block 16. Blasting cap 26 has leads 28 which extend from within tube 12 to the means for detonating the cap and for this purpose a slot 29 is formed in tube 12.

Tube 12 of the above described assembly may be supported in any suitable manner, as, for example, by a firing pedestal 31 having a base 32 and an upstanding stem or mandrel 33.

The first operation in setting up a test shot is that of assembling the necessary components in the pellet tube and this is best done at a table or bench. The tetryl pellet is first inserted in the tube and is positioned correctly by means of the cap support block 16, which is pushed in behind the pellet until flush with the lower end of the tube. It is essential that the variable gap built up of the spacer cards receive a booster shock of reproducible intensity from shot to shot. The darker end of the pellet should therefore enter the pellet tube first, for this is the region of maximum tetryl density, that is, where detonation velocity will be greatest, and should be situated adjacent to the stack of spacer cards 18.

The desired number of cards is placed in the other end of the tube and these cards are carefully pushed down so as to lie flat on the upper end of the pellet 17. The aligning or centering collar tube 23 is slid over the cup 19 and the stand-off collar tube 24 is pushed just far enough over the mouth of the cup to provide a ¼ inch separation between the cup and the target plate 25. This unit is then inserted in the pellet tube 13 and is carefully pushed down until the diaphragm 22 at the bottom of the cup makes good contact with the stacked spacer cards 18.

Blasting cap 26 is made ready by careful removal from its packing container and straightening of the attached leads, which leads if not long enough for eventual connection to the firing circuit at a safe distance from firing chamber, have extension leads attached to them. By means of a blasting galvanometer, the extension leads, or the cap leads, as the case may be, are checked for circuit continuity to make sure that they are shorted out, that is, connected together at the point where connection will be made to the firing circuit. After carefully inserting blasting cap into a length of heavy steel pipe, preferably located behind a shield or around the corner from the operator, similar continuity tests are made to insure that the wiring within the cap is not defective. The cap leads are then connected to the extension leads by tight twisting; care being taken to make sure that the two splices cannot short the cap by making contact with each other, or the ground. If no extension leads are used, the cap leads are shorted by twisting together.

In the firing chamber, the support tube 12, slotted end up, is slid down over the stem 33 of the firing pedestal 31, or some other supporting mandrel. The coupling tube 14 is then slid over the upper end of the pellet tube 13 for a short distance of about 3 inches. The blasting cap 26 is then carefully pushed into the hole 27 in the cap support block 16 until its tip touches the lower face of the tetryl pellet 17. The lower end of the pellet tube is placed on top of the support tube 12, care being taken that the cap leads 28 pass through the slot 29. The coupling tube is then slid down to encircle both the support tube 12 and the pellet tube 13.

The liquid under test is then poured into the cup with the level thereof as high as possible without risking overflow and consequent wetting of the standoff collar tube 24. Use of a stirring rod to guide the liquid stream helps to minimize the chance of spillage. The extension leads, or cap leads if no extension leads are used, are disconnected from each other and connected to the terminals of a firing circuit which has been previously checked for continuity. The firing circuit has terminals at its other end located a safe distance from the firing chamber and to the last named terminals a blasting machine is adapted to be connected and after a suitable warning is given, a shot is fired by operation of the blasting machine.

The sensitivity value for a given liquid explosive is taken as the number of 10 mil cellulose acetate spacer cards required for a gap at which the liquid explosive detonates in 50% of the test shots. This value is first located roughly by making a number of shots widely different in gap and the region lying between the detonations and non-detonations is then concentrated upon. After each detonation, the gap is increased by one card, and after each failure it is decreased by one card. As this procedure is carried out, a symmetrical distribution of detonation and non-detonation becomes evident, having as its midpoint the desired sensitivity value. For an untried liquid, 15 to 25 shots are usually needed to get a reliable value.

Figure 2:
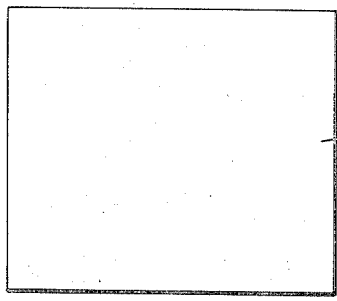
Fig. 2 is a plan view of a target plate before a firing test.
Figure 3:
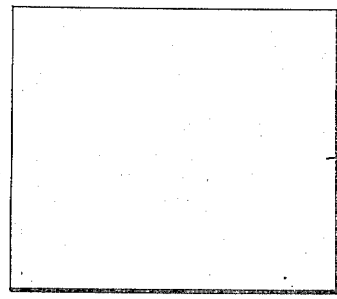
Fig. 3 is a plan view of the target plate after a firing test with the plate in contact with the liquid explosive; the explosive having failed to detonate.
Figure 2A:
Fig. 2a is an elevational view of the plate of Fig. 2.
Figure 3A:
Fig. 3a is an elevational view of the plate of Fig. 3.
Figure 4:
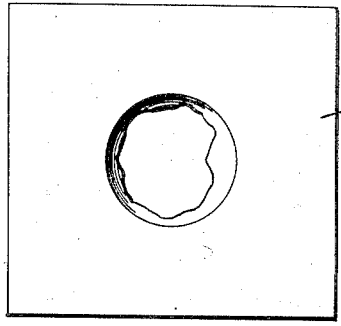
Fig. 4 is a plan view of a target plate after detonation with the plate in contact with the liquid explosive.
Figure 5:
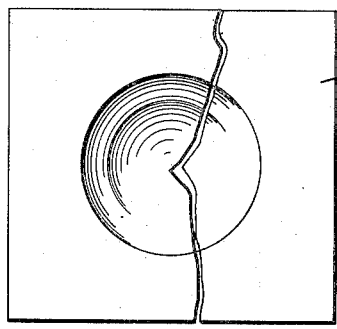
Fig. 5 is a plan view of a target plate after a firing test, the plate being positioned slightly above the liquid explosive during detonation of the same.
Figure 4A:
Fig. 4a is an elevational view of the plate of Fig. 4.
Figure 5A:
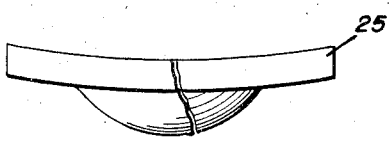
Fig. 5a is an elevational view of the plate of Fig. 5.

Figs. 2 and 2a show the condition of target plate 25 before the firing test. Figs. 3 and 3a illustrate the condition of the target plate 25 when there has been partial release of energy by the liquid due to a failure or a successful initiation which decays rapidly and releases very little energy and is accordingly considered a non-detonation. Figs. 4 and 4a indicate the condition of a target plate after a successful detonation; in this case the plate being in contact with the liquid explosive. Figs. 5 and 5a indicate the condition of target plate after detonation but with the plate positioned slightly above the liquid.

From the foregoing, it should be apparent that applicants have invented a test device which is relatively simple, inexpensive to produce and readily assembled in a rapid and facile manner, and thereby keeping down the time and cost per test shot.

Various modifications are contemplated and may obviously be resorted to by those skilled in the art without departing from the spirit and scope of the invention, as only a preferred embodiment thereof has been disclosed.

What is claimed is:

An explosive sensitivity test device comprising a firing pedestal including a base and an upright stem, a support tube slipped over said stem and extending upwardly therefrom, said support tube having a slot in the upper portion thereof, a pellet tube resting on the upper end of the support tube coaxially therewith, a snug-fitting coupling tube encircling the adjacent ends of the support and pellet tubes and holding the same in alignment, a booster charge supported within the lower portion of the pellet tube, a set of spacer cards resting on top of said booster charge, a cup for liquid explosive supported by said spacer cards, said cup being centered within the pellet tube by means of a centering collar within the pellet tube and encircling said cut, a stand-off collar encircling the upper end of said cup with the top edge of said stand-off collar above the top edge of said cup, a target plate resting on said stand-off collar and held in spaced relation to said liquid explosive by said stand-off collar, and firing means for said booster charge comprising a blasting cap with the cap end thereof in contact with the bottom of said booster charge and the lower portion thereof disposed in said support tube, said blasting cap having firing leads extending exteriorly of said support tube through said slot.

References Cited in the file of this patent

UNITED STATES PATENTS

| 1,801,449 | Olsen et al. | Apr. 21, 1931 |
| 2,493,725 | McMorris | Jan. 3, 1950 |